United States Patent [19]

Aldridge et al.

[11] Patent Number: 5,681,064
[45] Date of Patent: Oct. 28, 1997

[54] GASKET RETAINER

[75] Inventors: Lewis L. Aldridge, Parsippany-Troy Hills Township; Patrick P. Barber, Kinnelon, both of N.J.

[73] Assignee: EWAL Manufacturing Co., Inc., Belleville, N.J.

[21] Appl. No.: 499,677

[22] Filed: Jul. 7, 1995

[51] Int. Cl.$^6$ ............................................. F16L 19/00
[52] U.S. Cl. .......................... 285/379; 285/93; 285/328
[58] Field of Search ................................. 285/379, 328, 285/354, 380, 93

[56] References Cited

U.S. PATENT DOCUMENTS

| | | |
|---|---|---|
| 949,658 | 2/1910 | Randall . |
| 1,133,320 | 3/1915 | Rockwood . |
| 2,041,136 | 5/1936 | Klingner . |
| 2,292,216 | 8/1942 | Doran . |
| 2,462,762 | 2/1949 | Nardin . |
| 2,466,527 | 4/1949 | Wolfram . |
| 2,619,357 | 11/1952 | Montgomery . |
| 3,080,171 | 3/1963 | Booth . |
| 3,139,294 | 6/1964 | Richards, Jr. . |
| 3,262,722 | 7/1966 | Gastineau . |
| 3,275,348 | 9/1966 | Scott . |
| 3,298,719 | 1/1967 | Bills et al. . |
| 3,332,709 | 7/1967 | Kowalski . |
| 3,521,910 | 7/1970 | Callahan, Jr. et al. . |
| 3,695,640 | 10/1972 | Clague . |
| 4,540,205 | 9/1985 | Watanabe et al. . |
| 4,552,389 | 11/1985 | Babuder et al. . |
| 4,570,981 | 2/1986 | Fournier et al. . |
| 4,650,227 | 3/1987 | Babuder et al. . |
| 4,685,707 | 8/1987 | Miyashita . |
| 4,838,583 | 6/1989 | Babuder et al. . |
| 4,854,597 | 8/1989 | Leigh . |
| 5,060,987 | 10/1991 | Miller . |
| 5,066,051 | 11/1991 | Weigl et al. . |
| 5,087,085 | 2/1992 | McGarvey ........................... 285/917 |
| 5,135,269 | 8/1992 | Babuder . |
| 5,145,219 | 9/1992 | Babuder . |
| 5,163,721 | 11/1992 | Babuder . |
| 5,299,843 | 4/1994 | Weigl et al. . |
| 5,340,174 | 8/1994 | Shinohara et al. ................. 285/379 |
| 5,355,908 | 10/1994 | Berger et al. ..................... 285/917 |
| 5,366,261 | 11/1994 | Ohmi et al. ...................... 285/379 |

FOREIGN PATENT DOCUMENTS

| | | |
|---|---|---|
| 651733 | 11/1962 | Canada . |
| 0 514 793 A1 | 11/1992 | European Pat. Off. . |
| 0 566 980 A1 | 10/1993 | European Pat. Off. . |
| 0 567 924 A1 | 11/1993 | European Pat. Off. . |
| 984093 | 2/1951 | France . |
| 440 727 | 2/1927 | Germany . |
| 921 903 | 2/1955 | Germany . |
| 1 775 199 | 7/1971 | Germany . |
| 27 38 244 | 3/1979 | Germany . |
| 6147174 | 3/1986 | Japan ............................. 285/379 |
| 6147175 | 3/1986 | Japan ............................. 285/379 |
| 5-141576 | 5/1993 | Japan . |
| 783397 | 9/1957 | United Kingdom . |
| 1163710 | 3/1968 | United Kingdom . |
| 1167680 | 10/1968 | United Kingdom . |

*Primary Examiner*—Eric K. Nicholson
*Attorney, Agent, or Firm*—Anthony J. Casella; Gerald E. Hespos; Ludomir A. Budzyn

[57] ABSTRACT

A gasket retainer is provided for a fluid coupling. The gasket retainer is machined or molded from plastic, and defines a short tubular shape with a gasket mounting end and an opposed coupling mounting end. A positioning flange extends inwardly intermediate the opposed ends of the retainer. Portions of the retainer between the positioning flange and the gasket retaining end define a gasket seat with a chamfered entry for securely receiving a gasket therein. Portions of the retainer between the positioning flange and the coupling mounting end define a coupling seat dimensioned to grippingly engage the coupling. The coupling mounting end of the retainer may include slits to facilitate the resilient deflection of the retainer that is required for secure gripping of the coupling component, and to permit leak testing. The retainer may be transparent to permit visual checking for the presence of the gasket.

21 Claims, 2 Drawing Sheets

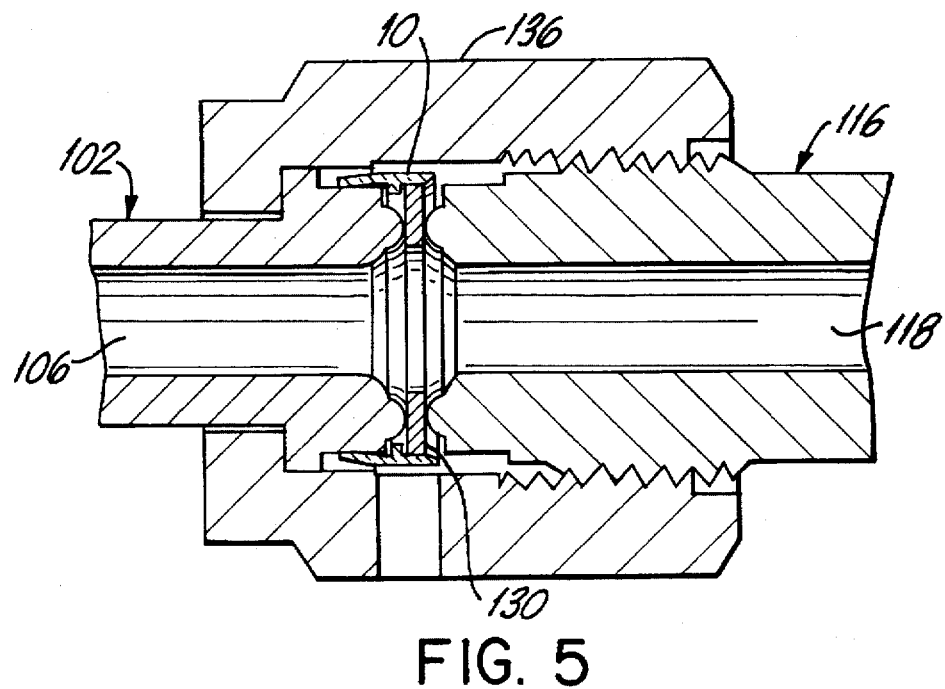
FIG. 5
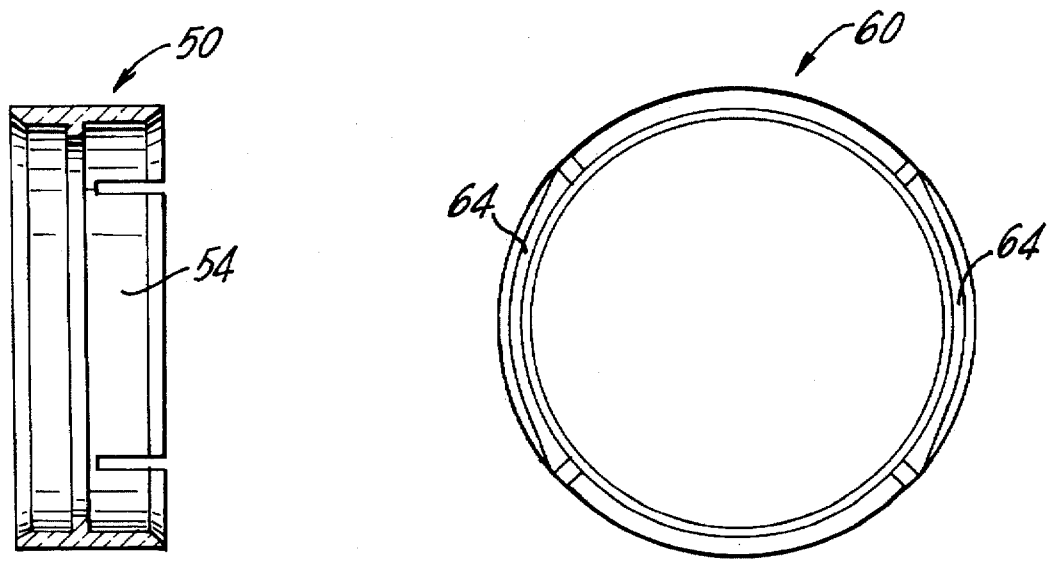
FIG. 6
FIG. 7

5,681,064

GASKET RETAINER

BACKGROUND OF THE INVENTION

1. Field of the Invention

The subject invention relates to fluid couplings, and particularly retainers for positioning gaskets between fittings of a coupling in a high-purity gas flow system.

2. Description of the Prior Art

Many industrial processes require the presence of a specified gas. The gas is transported through a system of tubes to appropriate locations in an industrial facility. The system of tubes includes couplings that periodically may be disconnected and reconnected. Any coupling used for these purposes must prevent leakage in either direction. In particular, the coupling must prevent an in-flow of ambient air that could affect the purity of the gas being transported. Similarly, many gases are harmful or combustible, and thus the coupling must prevent an out-flow of the gas into the surrounding environment.

A typical prior art coupling for high pressure gas is shown in FIG. 1, and is identified generally by the numeral 100. The prior art coupling 100 includes a first coupling component 102 having a mating end 104, an opposed end (not shown) and a cylindrical gas passage 106 extending axially therebetween. The mating end 104 has a radially extending planar end face 108. An annular sealing bead 110 of outside diameter "p" concentrically surrounds the gas passage 106, and projects a distance "q" from the planar end face 108. The mating end 104 further includes a shoulder 112 facing the opposed end of the coupling component 102. A cylindrical surface 114 of diameter "r" and length "s" extends between the end face 108 and the shoulder 112.

The prior art coupling 100 further includes a second coupling component 116 with a gas passage 118 extending axially therethrough. The second coupling component 116 includes a radially aligned planar end face 120. An annular sealing bead 122 projects from the end face 120 and surrounds the gas passage 118. External threads 124 are formed around the second coupling component 116 in proximity to the end face 120.

The prior art coupling 100 further includes a metallic gasket 126 intermediate the first and second coupling components 102 and 116. The gasket 126 includes inner and outer circumferential surfaces 128 and 130 respectively and opposed sealing faces 132 and 134. The outer circumferential surface 130 has a diameter "t" approximately equal to the diameter "r" of the cylindrical surface 114 on the first coupling component 102.

The prior art coupling 100 also includes a nut 136 having an array of internal threads 138. The nut 136 also includes an inwardly extending annular flange 140 surrounding the tubular body of the first coupling component 102 and dimensioned to engage the shoulder 112 of the first coupling component 102. Threaded tightening of the nut 136 with the threads 124 on the second coupling component 116 urges the sealing beads 110 and 122 into tight sealing engagement with the opposed faces 132 and 134 of the prior art gasket 126. A probe hole 142 extends radially through the nut 136 to permit leak testing of the connection.

Prior art couplings take many other forms with structural and functional similarities to the prior art coupling 100 shown above. For example, some prior art couplings have two components identical to the first coupling component 102 of FIG. 1. Male and female nuts urge the sealing beads of these identical components into sealing engagement with the gasket.

The prior art coupling 100 shown in FIG. 1 is widely used in the compressed gas industry and is very effective for high purity gas flow systems. However, proper alignment of the gasket 126 can be difficult due to the small sizes of the components and the inaccessibility of the end faces during mating. An improperly aligned gasket can affect the integrity of the seal in the coupling. Improperly aligned gaskets also can generate wear debris as coupling components and the gasket slide relative to one another.

The prior art includes many retainers that attempt to overcome the above described problems of positioning and holding a gasket while a coupling is being connected. One relevant prior art structure is shown in U.S. Pat. No. 3,262,722 which issued to Gastineau on Jul. 26, 1966. Gastineau employs an O-ring between two coupling components and a retainer for holding the O-ring. The retainer of Gastineau includes a planar wall with a circular opening having an inside diameter dimensioned to engage around the outer circumference of the O-ring. The Gastineau retainer further includes a plurality of resilient tabs projecting orthogonally from the planar wall to resiliently grip one of the two coupling components. Gastineau is somewhat undesirable in that it requires fairly close manufacturing tolerances to ensure that the thickness of the planar wall of the retainer does not exceed the desired thickness of the O-ring after sealing. A retainer that is too thick may prevent the O-ring from achieving its optimum sealing efficiency. Additionally, Gastineau provides no structure for positively positioning the O-ring relative to the retainer. Thus the O-ring could become mispositioned or disengaged as the O-ring/retainer subassembly is being mounted on the coupling component.

Another O-ring retainer is shown in German Patent No. 440,727 dated Mar. 30, 1926. The retainer shown in German Patent No. 440,727 is a cylindrical sleeve dimensioned to telescope onto a portion of a coupling component and to surround the outer circumference of an O-ring. This design would be difficult to manufacture and use with a flat metallic gasket. In this regard, very close tolerances would have to be maintained between the outside diameter of the coupling member, the inside diameter of the cylindrical retaining sleeve and the outside diameter of the flat metallic gasket. Furthermore, the German reference provides no structure for controlling the axial positioning of the O-ring relative to the retainer.

The German reference could provide more serious problems in a high pressure system of very pure gas. As noted above high purity gas systems must be leak-free. These systems are tested for leaks by tightly wrapping each coupling in plastic, and then filing the space between the plastic and the coupling with helium. An end of the system is then connected to a vacuum pump with means for detecting trace amounts of helium that might leak through the seals at the couplings. The cylindrical sleeve retainer of the German reference would be drawn tight to the coupling component by the vacuum and thus could mask a leak. However, during normal use, the coupling would be subject to high positive pressure that would permit or encourage leakage between the cylindrical sleeve and the coupling.

U.S. Pat. No. 2,041,136 and French Patent No. 984,093 both show retainers that at least partly overlie the gasket and hence contribute to the sealing function. This can create design problems in that metals with good sealing characteristics generally do not exhibit the resiliency necessary for gripping the coupling component, while resilient metals are not sufficiently soft for sealing.

Several more recent references show gasket retainers that are specifically intended for high purity and/or high pressure gas applications. For example, U.S. Pat. No. 4,552,389 to Babuder et al. shows a coupling similar to the prior art coupling depicted in FIG. 1 above. The coupling of U.S. Pat. No. 4,552,389 further includes a metallic gasket retainer having a cylindrical wall dimensioned to surround the outer circumference of the prior art gasket. A planar wall projects inwardly from one end of the cylindrical wall for engaging an outer circumferential region on one planar face of the gasket. A plurality of legs extend axially from the opposed end of the cylindrical wall for gripping the coupling component. The retainer is intended to prevent movement of the gasket relative to either coupling component during each disconnection and subsequent reconnection of the coupling. It is believed that even a perfectly manufactured retainer cannot ensure exact alignment after a reconnection, and even a microscopically small deviation from a perfect alignment has the same effect on sealing performance as a gross repositioning. The retainer of U.S. Pat. No. 4,552,389 is somewhat undesirable in that the metallic cylindrical side wall conceals the gasket. Thus it is not possible to visually confirm the presence of the gasket through the probe hole in the coupling nut.

U.S. Pat. No. 4,650,227 also issued to Babuder et al. and shows a generally planar gasket having a plurality of resilient legs extending unitarily therefrom for griping one of the coupling components. As noted above, however, materials having appropriate characteristics for sealing often do not exhibit the resiliency necessary to grip the coupling component. Conversely resilient metals generally do not seal well.

U.S. Pat. No. 4,838,583 also issued to Babuder et al. and shows a retainer with a split end wall for engaging one mating face of a gasket, and a split cylindrical side wall for engaging both an outer circumference of the gasket and an outer circumferential surface of a coupling component. As noted above, retaining exact positioning of the gasket relative to the coupling components during each disconnection and subsequent reconnection requires tight griping by the retainer. This necessarily requires closely monitored dimensional tolerances. Dimensions that are too small can warp the thin gasket. Additionally, as with previously mentioned embodiments, cylindrical portions of the gasket retainer obscure the gasket and hence prevent visual checking for the gasket presence.

The prior art includes still other variations of gasket retainers for high purity and/or high pressure gas couplings. For example, U.S. Pat. No. 5,163,721 to Babuder shows a gasket having notches in its outer circumference. A gasket retainer includes a cylindrical collar and legs dimensioned and disposed for engaging the notches of the gasket. The legs of the retainer are slid into the notches of the gasket and are then folded inwardly to grip the gasket against the cylindrical collar. Published European Patent Appl. No. 0 514 793 A1 shows a gasket retainer with a cylindrical side wall, a plurality of resilient legs for griping a coupling component and a planar end wall extending through approximately one-half the circumference of the cylindrical side wall. The retainer is intended to permit slidable insertion of a gasket between the retainer and the coupling component after the retainer has been mounted onto the coupling component. Published European Patent Appl. No. 0 567 924 A1 shows a gasket having an annular step in its outer circumference. A gasket retainer is dimensioned and configured to securely seat in the annular step in the outer circumference of the gasket. Finally, U.S. Pat. No. 4,854,597 shows a gasket with steps near the inner circumference. The steps are intended to mate closely with the annular sealing beads on the coupling components. This design requires very close dimensional tolerances.

Most of the above described metallic gasket retainers must be stamped and formed into fairly complex shapes and to close dimensional tolerances. Additionally, most of the prior art gasket retainers require the gasket to be moved entirely through the gasket retainer from the connector mounting end to the gasket retaining end. A dimensional fit that is too tight can cause a deformation of the gasket or the retainer during this initial rear to front assembly. The above referenced U.S. Pat. No. 5,163,721 permits a front to rear assembly of the gasket and the retainer, but requires a specially manufactured gasket and a post-assembly deformation of the retainer.

Accordingly, it is an object of the subject invention to provide a gasket retainer of simple design and construction.

Another object of the subject invention is to provide a gasket retainer that can be manufactured inexpensively.

A further object of the subject invention is to provide a gasket retainer that does not require extremely precise dimensional tolerances.

Yet another object of the subject invention is to provide a gasket retainer that permits visual conformation of the gasket presence in the assembled coupling.

An additional object of the subject invention is to provide a gasket retainer that enables the gasket to be conveniently mounted directly into the gasket retaining end of the retainer.

Still another object of the invention is to provide a gasket that permits accurate leak testing.

SUMMARY OF THE INVENTION

The subject invention relates to a gasket retainer for a fluid coupling and to a fluid coupling having such a gasket retainer. The fluid coupling may be a prior art coupling as described above and includes first and second coupling components, a metallic gasket and means for urging the coupling components into tight sealing engagement with the gasket. Each of the coupling components includes an end face which may include an annular sealing bead extending thereabout to define a generally circular region of contact with one face of the gasket. At least one of the coupling components includes a cylindrical outer surface extending generally orthogonally from the end face.

The gasket is generally annular and includes an inner circumferential edge, an outer circumferential edge and sealing faces extending therebetween. The inner circumferential edge preferably defines a diameter equal to or greater than the diameter of the fluid passage through the coupling components. The outer circumferential edge may define a diameter approximately equal to the diameter of the cylindrical surface extending from the end face of the first coupling component. The sealing faces of the gasket may be generally planar and parallel to one another. However, gaskets with non-planar self-centering configurations may be employed. For example, the opposed faces of the gasket may have an annular step or an annular groove dimensioned and configured to be engaged by sealing beads on the coupling components for urging the gasket into concentricity with the coupling components.

The means for urging the coupling components into sealing engagement with the gasket may include arrays of interengageable threads. For example, interengageable male and female nuts may be mounted on the respective components and may be engageable with circumferential shoulders on the respective coupling components. Alternatively, a nut rotatably mounted on one coupling component may be threadedly engageable with threads integral with the other coupling component.

The retainer is a short generally tubular element that preferably is of unitary construction. The retainer preferably is formed from a plastic material that is strong, resilient, creep resistant and substantially inert to gases that may flow through the coupling. A material meeting these criteria is a homo polymer of chlorotrifluoroethylene (PCTFE) and a preferred material is marketed by 3M Company under the trademark KEL-F. Preferably the retainer is transparent.

The gasket retainer includes a gasket mounting end, a coupling mounting end and opposed inner and outer circumferential surfaces. The inner surface is characterized by an inwardly extending positioning flange intermediate the opposed ends. Portions of the retainer between the positioning flange and the gasket mounting end define a gasket seat. The gasket seat is characterized by a generally radially aligned planar surface on the positioning flange and a cylindrical gasket engaging surface extending orthogonally from the positioning flange. The cylindrical gasket engaging surface has an inside diameter equal to or preferably less than the outside diameter of the gasket. Portions of the retainer between the cylindrical gasket engaging surface and the extreme gasket mounting end of the retainer define an outwardly flared chamfer. The chamfer functions to guide the gasket into the gasket seat and further functions as a ramp which generates a slight outward deflection of the retainer as the gasket is urged into the seat.

Portions of the retainer between the positioning flange and the coupling mounting end define a coupling component seat. The coupling component seat may comprise a plurality of gripping fingers extending from the positioning flange and separated from one another by longitudinally extending slots. Portions of the retainer adjacent the extreme coupling mounting end may define outwardly flared chamfers on the gripping fingers which function to guide the retainer onto the coupling component and which may function as ramps for generating outward deflection of the gripping fingers. The inwardly facing gripping surfaces of the gripping fingers may be sections of a cylinder with an inside diameter selected to achieve tight gripping engagement with the cylindrical surface of the coupling component. Alternatively, the gripping fingers may be conically generated to define slightly smaller inside diameters at distances further from the positioning flange. These conically generated gripping fingers may be configured and dimensioned to require outward deflection as the retainer is urged onto the coupling component. The slots in the retainer may further be dimensioned to prevent masking of leaks.

The coupling mounting end of the retainer may take other configurations to permit easy mounting onto the coupling component and resilient engagement therewith. For example, the coupling mounting end may be formed into a non-round shape, such as an oval or lobed shape with minor and major internal dimensions. Minor internal dimensions may be selected to require resilient deformation for mounting onto the coupling component. Thus, the coupling mounting end of the retainer will be deformed into a substantially cylindrical shape conforming to the coupling member and the deformed portions of the coupling mounting end will exert radially inward forces against the coupling member for preventing separation of the retainer.

BRIEF DESCRIPTION OF THE DRAWINGS

FIG. 5 is a cross-sectional view showing the assembled coupling and retainer of FIG. 4.

FIG. 6 is a cross-sectional view similar to FIG. 4 but showing a second embodiment of the retainer.

FIG. 7 is an end elevational view of a third embodiment of the gasket retainer.

DETAILED DESCRIPTION OF THE PREFERRED EMBODIMENTS

Figure 1:
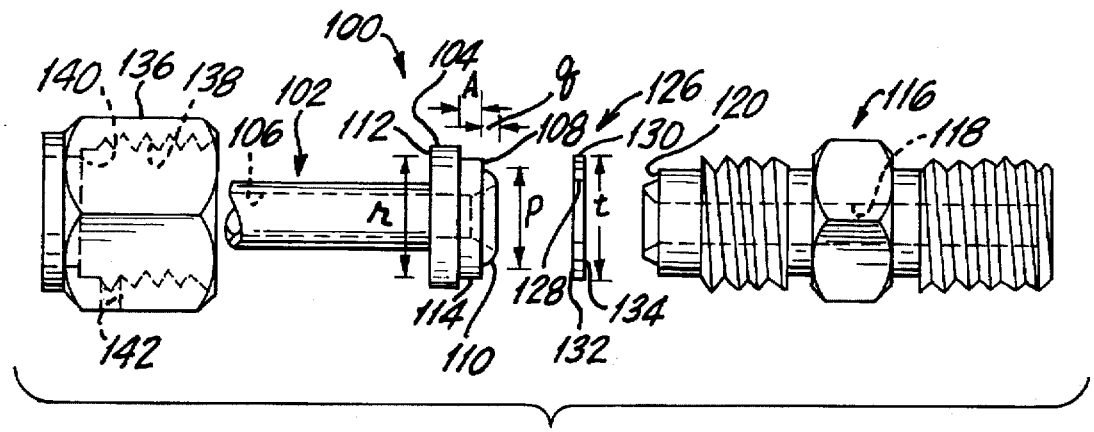
FIG. 1 is an exploded perspective view of a prior art coupling.
Figure 2:
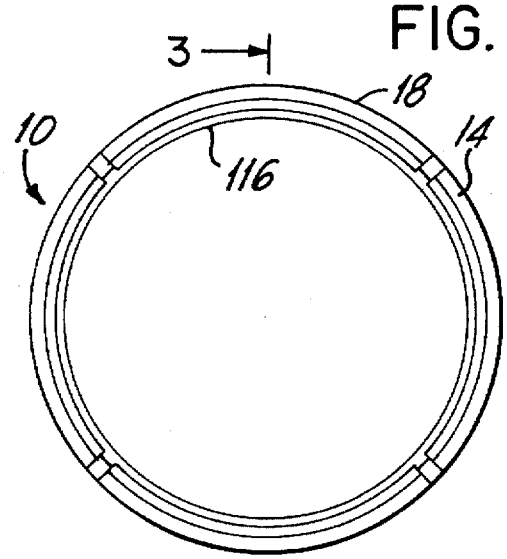
FIG. 2 is an end elevational view of a gasket retainer in accordance with the subject invention.
Figure 3:
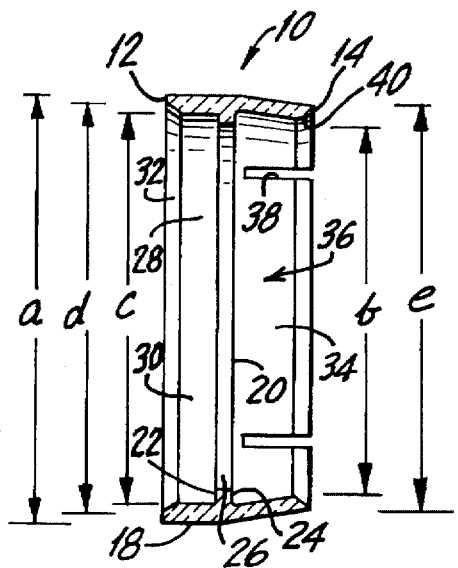
FIG. 3 is a cross-sectional view taken along line 3—3 in FIG. 2.

A gasket retainer in accordance with the subject invention is identified generally by the numeral 10 in FIGS. 2 and 3. The gasket retainer 10 can be employed with the prior art coupling 100 of FIG. 1 or other similar couplings.

The retainer 10 is unitarily formed from a transparent PCTFE material, and preferably material marketed under the name KEL-F by 3M Company. The retainer 10 depicted in FIGS. 2 and 3 preferably is unitarily molded into the illustrated shape. However, other embodiments described and illustrated further herein may be machined from a molded or extruded plastic stock material.

The gasket retainer 10 is of generally short tubular shape with a gasket mounting end 12, a coupling mounting end 14 an inner and outer circumferential surfaces 16 and 18 extending between the ends. The outer circumferential surface 18 defines maximum outside diameter "a" which is selected to fit within the prior art nut 136, as described further herein.

The inner circumferential surface 16 of the retainer 10 is characterized by an inwardly extending annular positioning flange 20 intermediate the opposed ends 12 and 14 of the retainer 10. The positioning flange 20 includes a radially aligned planar gasket mounting face 22, a radially aligned coupling mounting face 24 and an axially short cylindrical edge 26 extending therebetween. The cylindrical edge 26 defines an inside diameter "b" which is less than the diameter "r" of the cylindrical surface 114 on the coupling component 102. However, the cylindrical edge 26 of the positioning flange 20 is greater than the outside diameter "p" of the sealing bead 110 on the coupling component 102.

The inner circumferential surface 16 of the retainer 10 further includes a cylindrically generated gasket engaging surface 28 extending orthogonally from the gasket mounting face 22 of the positioning flange 20 and toward the gasket mounting end 12 of the retainer 10. The cylindrical gasket engaging surface 28 and the planar gasket mounting face 22 on the positioning flange 20 combine to define a gasket seat 30 within the retainer 10. The cylindrical gasket engaging surface 28 defines an inside diameter "c" which is less than the outside diameter "t" of the gasket 126 to be seated therein. For example, on a coupling having a gasket 126 with an outside diameter "t" of 0.462 inch, the diameter "c" of the cylindrical gasket engaging surface 28 will be approximately 0.450 inch. Thus, portions of the retainer 10 defining the gasket seat 30 must be expanded slightly outwardly to grippingly engage the gasket 126.

The inner circumferential surface 16 of the retainer 10 further includes a chamfer 32 adjacent the gasket mounting end 12. The chamfer 32 flares outwardly to define a major diameter "d" which is slightly greater than the outside diameter "t" of the gasket 126 to be secured in the gasket seat 30. For example, a major diameter "d" of the chamfer 32 will be approximately 0.470 inch for the above described gasket 126 having an outside diameter "r" of 0.462 inch. The chamfer 32 facilitates the alignment of the gasket 126 during insertion into the gasket seat 30. Additionally, the chamfer 32 functions as a ramp which generates the outward expansion of the retainer 10 for grippingly engaging the gasket 126.

Portions of the interior surface 16 between the positioning flange 20 and the coupling mounting end 14 includes inwardly tapering fingers 34 defining sections of a frustum having a major diameter "e" substantially adjacent the positioning flange 20. The major diameter "e" preferably is slightly greater than the outside diameter "r" of the cylindrical surface 114 on the coupling member 102. The radial aligned face 24 on the positioning flange 20 and the inwardly tapering fingers 34 adjacent thereto define a coupling seat 36 into which the mating end 104 of the coupling component 102 is mounted. The inwardly tapering shape of the fingers 34 requires an outward deflection for mounting onto the coupling component 102. This outward deflection is facilitated by a plurality of axially aligned slits 38 extending from the coupling mounting end 14 toward the positioning flange 20. The outward deflection is further facilitated by an outwardly flared chamfer 40 at the extreme coupling mounting end 14. The minor diameter defined at the interface of the coupling engaging surface 34 and the chamfer 40 is less than the diameter "r" of the cylindrical surface 114 on the coupling component 102. However, the major diameter "g" defined by the chamfer 40 is greater than the diameter "r" of the cylindrical surface 114 on the coupling component 102. Thus, the chamfer 40 functions as a ramp to generate the outward deflection of the fingers 34 that is required to urge the retainer 10 onto the coupling component 102.

Figure 4:
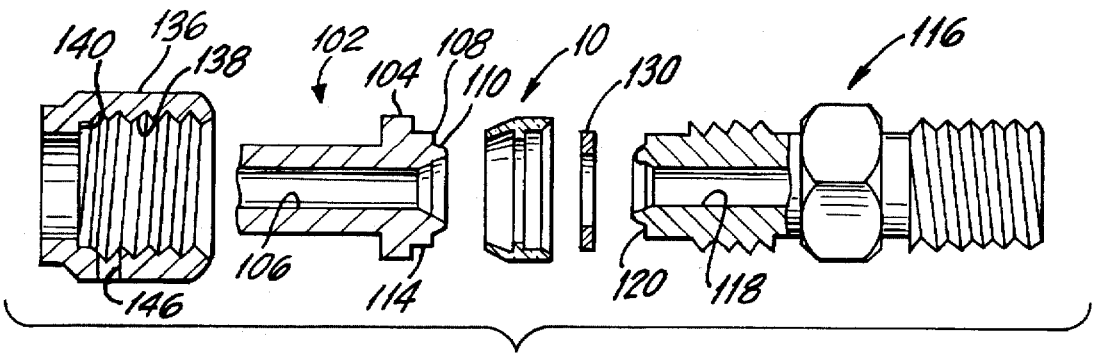
FIG. 4 is an exploded cross-sectional view showing a coupling and the gasket retainer of FIGS. 2 and 3.

The retainer 10 is used with the prior art coupling 100 as shown in FIGS. 4 and 5. More particularly, the prior art gasket 106 is urged into the gasket mounting end 12 of the retainer 10. The outer circumferential surface 130 of the prior art gasket 126 will engage the chamfer 32 at the gasket mounting end 12 of the retainer 10. Ramping forces generated by the chamfer 32 against the prior art gasket 126 will cause a slight outward expansion of the retainer 10 to permit the gasket 126 to be securely gripped in the gasket seat 30. In this fully seated position, the planar face (132 or 134) of the gasket 126 will be seated against the radially aligned gasket mounting face 22 of the positioning flange 20. The outer circumferential surface 130 of the prior art gasket 126 will be gripped by the cylindrical gasket engaging surface 28 of the retainer 10 with sufficient force to prevent accidental dislodgement, but with a sufficiently low force to avoid deformation of the gasket 126.

The subassembly of the retainer 10 and the prior art gasket 126 is then mounted onto the coupling component 102. More particularly, the chamfer 40 at the coupling mounting end 14 of the retainer 10 is urged into ramping engagement with the mounting end 104 of the coupling member 102. The ramping forces generated by the chamfer 40 will cause an outward deflection of fingers 34 of the retainer 10 intermediate adjacent slots 38. The resilient PCTFE material of the retainer 10 will cause the deflected fingers 34 between slots 38 to grippingly engage the cylinder surface 114 of the mating end 104 on the coupling member 102. This gripping will be sufficient to prevent inadvertent dislodgement of the retainer 10 from the coupling member 102 prior to complete connection of the coupling.

Connection of the coupling 100 is completed as in the prior art by merely threadedly engaging the nut 136 with threads 124 on the second coupling component 116. More particularly, the outside diameter "a" of the retainer 10 is sufficiently small to permit unimpeded movement of the nut 136 over the retainer 10.

As noted above, the major diameter "e" defined by portions of the inwardly tapering fingers 34 adjacent the positioning flange 20 exceeds the diameter "r" of the cylindrical surface 114 on the coupling component 102. These relative dimensions in combination with the slots 38 ensure that the retainer 10 will not mask leaks, and that the above described leak tests can be carrier out with accuracy. Additionally the transparent characteristics of the retainer 10 enables accurate visual inspection at the probe hole 142 to confirm the presence of the gasket 126.

The subassembly of the retainer 10 and the gasket 122 can readily be removed and replaced upon disconnection of the coupling 100. More particularly, the PCTFE material of the retainer 10 is sufficiently resilient to readily permit disengagement of the retainer 10 and the gasket 126 in response to pulling forces exerted on the retainer 10. The gasket 126 necessarily will separate from the coupling member 102 simultaneously with the retainer 10 in view of forces exerted by the positioning flange 20. Thus, the retainer 10 ensures that the gasket 122 does not inadvertently remain on the coupling member 102 in a manner that could adversely affect sealing on subsequent reconnections. Further, the gasket 122 will remain in the retainer 10, and will not fall into a potentially inaccessible location near the coupling. The subassembly of the retainer 10 and the gasket 126 then can be discarded and replaced or reused during a subsequent reconnection.

FIG. 5 shows an alternate retainer 50 which is structurally similar and functionally identical to the retainer 10 described and illustrated in FIGS. 3–6. The retainer 50 does not include the inwardly tapering conically generated fingers between the coupling mounting end and the positioning flange. Rather, the retainer 50 includes cylindrically generated fingers 54 which are dimensioned to merely closely engage the outer cylindrical surface 114 of the coupling component 102 without the extensive deformation described and illustrated with the retainer 10. Rather, the retainer 50 will be held on the coupling component 102 more by a frictional interference and/or a minor deformation.

Another optional retainer 60 is illustrated in FIG. 7. The retainer 60 includes a gasket seat substantially identical to the gasket seat 28 on the retainer 10. However, the retainer 60 includes a coupling seat 64 of non-round shape. Resiliently deflectable lobes define minor cross-sectional dimension in an unbiased condition, but deflect outwardly for gripping engagement onto a mating 104 end of the coupling member 102.

What is claimed is:

1. A gasket retainer for a fluid coupling, said coupling having first and second components, each said component having an end face, a fluid passageway extending into said end face and through said coupling component, at least said first component including a cylindrical surface of specified diameter extending orthogonally from said end face, said coupling further comprising an annular gasket having an outside diameter and being engageable between said end faces of said components:

said retainer being of substantially tubular shape with a gasket mounting end and an opposed coupling mounting end, an inwardly projecting positioning flange intermediate said opposed ends, said positioning flange having a gasket mounting face facing said gasket mounting end, portions of said retainer between said positioning flange and said gasket mounting end defining a gasket seat having a substantially cylindrical inner surface adjacent said positioning flange dimensioned for securely engaging said gasket and having an outwardly flared chamfer extending from said cylindrical inner surface to said gasket mounting end, said retainer defining a plurality of resiliently deflectable fingers extending from a location in proximity to said positioning flange to said coupling mounting end and defining a coupling seat dimensioned for securely engaging at least said cylindrical surface of said first coupling component, whereby said gasket can be securely engaged in said gasket retainer by passing said gasket through said outwardly flared chamfer at said gasket mounting end and into contact with said positioning flange.

2. The gasket retainer of claim 1, wherein said retainer is plastic.

3. The gasket retainer of claim 1, wherein said retainer is unitarily formed from a transparent material.

4. The gasket retainer of claim 1, wherein said retainer is unitarily formed of PCTFE.

5. A gasket retainer for a fluid coupling, said coupling having first and second components, each said component having an end face, a fluid passageway extending into said end face and through said coupling component, at least said first component including a cylindrical surface of specified diameter extending orthogonally from said end face, said coupling further comprising an annular gasket having an outside diameter and being engageable between said end faces of said components:

said retainer being of substantially tubular shape with a gasket mounting end and an opposed coupling mounting end, an inwardly projecting positioning flange intermediate said opposed ends, said positioning flange having a gasket mounting face facing said gasket mounting end, portions of said retainer between said positioning flange and said gasket mounting end defining a gasket seat dimensioned for securely engaging said gasket, said gasket seat includes a cylindrical gasket engaging surface extending from said gasket mounting face of said positioning flange, said cylindrical gasket engaging surface defining a diameter less than the outside diameter of said gasket such that said retainer resiliently expands and grippingly retains said outer circumference of said gasket, said retainer defining a plurality of resiliently deflectable fingers extending from a location in proximity to said positioning flange to said coupling mounting end and defining a coupling seat dimensioned for securely engaging at least said cylindrical surface of said first coupling component.

6. The gasket retainer of claim 5, wherein said gasket mounting end of said retainer includes a chamfer adjacent said gasket seat and defining a major diameter greater than said outside diameter of said gasket for facilitating insertion of said gasket into said gasket seat.

7. The gasket retainer of claim 1, wherein portions of said fingers adjacent said coupling mounting end are formed to define an outwardly extending chamfer.

8. The gasket retainer of claim 1, wherein said fingers are defined by a plurality of slots extending longitudinally from said coupling mounting end toward said positioning flange.

9. The gasket retainer of claim 1, wherein said fingers are angled inwardly.

10. A gasket retainer for a fluid coupling, said coupling having first and second components, each said component having an end face, a fluid passageway extending into said end face and through said coupling component, at least said first component including a cylindrical surface of specified diameter extending orthogonally from said end face, said coupling further comprising an annular gasket having an outside diameter and being engageable between said end faces of said components:

said retainer being of substantially tubular shape with a gasket mounting end and an opposed coupling mounting end, an inwardly projecting positioning flange intermediate said opposed ends, said positioning flange having a gasket mounting face facing said gasket mounting end, portions of said retainer between said positioning flange and said gasket mounting end defining a gasket seat dimensioned for securely engaging said gasket, said retainer defining a plurality of resiliently deflectable fingers extending from a location in proximity to said positioning flange to said coupling mounting end and defining a coupling seat dimensioned for securely engaging at least said cylindrical surface of said first coupling component, said fingers being angled inwardly, wherein portions of said coupling seat adjacent said positioning flange define a diameter greater than the diameter of the cylindrical surface of said first coupling component, portions of said coupling seat remote from said positioning flange defining a cross-sectional dimension less than the diameter of said cylindrical surface of said first coupling component.

11. The gasket retainer of claim 10, wherein portions of said fingers at said coupling mounting end are chamfered outwardly to define a major cross-sectional dimension greater than the diameter of the cylindrical surface of said first coupling component for facilitating mounting of said gasket retainer onto said first coupling component.

12. A gasket retainer for a fluid coupling, said coupling having first and second components, each said component having an end face, a fluid passageway extending into said end face and through said coupling component, at least said first component including a cylindrical surface of specified diameter extending orthogonally from said end face, said coupling further comprising an annular gasket having an outside diameter and being engageable between said end faces of said components:

said retainer being of substantially tubular shape with a gasket mounting end and an opposed coupling mounting end, an inwardly projecting positioning flange intermediate said opposed ends, said positioning flange having a gasket mounting face facing said gasket mounting end, portions of said retainer between said positioning flange and said gasket mounting end defining a gasket seat dimensioned for securely engaging said gasket, said retainer defining a plurality of resiliently deflectable fingers extending from a location in proximity to said positioning flange to said coupling mounting end and defining a coupling seat dimensioned for securely engaging at least said cylindrical surface of said first coupling component, wherein said coupling seat is of non-cylindrical cross-sectional configuration and includes at least one major radial dimension and at least one minor radial dimension, portions defining said minor radial dimension being resiliently deflectable for grippingly engaging said cylindrical surface of said first coupling component.

13. A gasket retainer for a fluid coupling, said coupling having first and second components, each said coupling component having an end face, a fluid passageway extending into said end face and through said coupling component, and an annular sealing bead surrounding said fluid passageway and projecting from said end face a selected distance, at least said first component including a cylindrical surface of specified diameter extending orthogonally from said end face, said coupling further comprising an annular gasket having an outside diameter and being engageable between said end faces of said components:

- said retainer being of substantially tubular shape with a gasket mounting end and an opposed coupling mounting end, an inwardly projecting positioning flange intermediate said opposed ends, said positioning flange having a gasket mounting face facing said gasket mounting end, portions of said retainer between said positioning flange and said gasket mounting end defining a gasket seat dimensioned for securely engaging said gasket, said retainer defining a plurality of resiliently deflectable fingers extending from a location in proximity to said positioning flange to said coupling mounting end and defining a coupling seat dimensioned for securely engaging at least said cylindrical surface of said first coupling component, said positioning flange including a coupling mounting face facing said coupling mounting end and an annular inner edge extending between said gasket mounting face and said coupling mounting face, said inner edge defining an axial dimension less than the projection of said annular bead from said end face and defining a diameter greater than said annular sealing bead.

14. A gasket assembly for a fluid coupling, said fluid coupling including first and second coupling components, each said component including an end face and a fluid passageway extending into said end face and through said component, at least said first coupling component including a cylindrical surface of specified diameter extending orthogonally from said planar end face thereof, said assembly comprising:

- a generally annular metal gasket having an outer circumferential surface defining an outside diameter, an inner circumferential surface and opposed mating surfaces extending between said inner and outer circumferential surfaces and defining an axial thickness for said gasket; and
- a gasket retainer of generally tubular shape and including gasket mounting end and an opposed coupling mounting end, an inwardly extending positioning flange intermediate said opposed ends, said positioning flange defining a gasket mounting face facing said gasket mounting end, portions of said retainer intermediate said positioning flange and said gasket mounting end defining a gasket seat having a substantially cylindrical inner surface adjacent said positioning flange grippingly engaging the outer circumferential surface of said gasket therein, an outwardly flared chamfer extending from said cylindrical surface to said gasket mounting end, said retainer defining a plurality of resiliently deflectable fingers extending from a location in proximity to said positioning flange to said coupling mounting end and being dimensioned for releasably engaging said cylindrical surface of said first coupling component, whereby said gasket can be securely engaged in said gasket retainer by passing said gasket through said outwardly flared chamfer at said gasket mounting end and into contact with said positioning flange.

15. The assembly of claim 14, wherein portions of said retainer intermediate said positioning flange and said gasket mounting end define an axial dimension greater than said axial thickness of said gasket such that said gasket is recessed in said gasket retainer.

16. The assembly of claim 14, wherein portions of said fingers are angled inwardly and are resiliently deflectable outwardly for secure releasable engagement with said first coupling component.

17. A gasket assembly for a fluid coupling, said fluid coupling including first and second coupling components, each said coupling component including an end face, a fluid passageway extending into said end face and through said component, and an annular sealing bead surrounding said fluid passageway and projecting from said end face a selected distance, at least said first coupling component including a cylindrical surface of specified diameter extending orthogonally from said planar end face thereof, said assembly comprising:

- a generally annular metal gasket having an outer circumferential surface defining an outside diameter, an inner circumferential surface and opposed mating surfaces extending between said inner and outer circumferential surfaces and defining an axial thickness for said gasket; and
- a gasket retainer of generally tubular shape and including a gasket mounting end and an opposed coupling mounting end, an inwardly extending positioning flange intermediate said opposed ends, said positioning flange defining a gasket mounting face facing said gasket mounting end, portions of said retainer intermediate said positioning flange and said gasket mounting end defining a gasket seat grippingly engaging said gasket therein, said retainer defining a plurality of resiliently deflectable fingers extending from a location in proximity to said positioning flange to said coupling mounting end and being dimensioned for releasably engaging said cylindrical surface of said first coupling component, said positioning flange including a coupling mounting face facing said coupling mounting end and an annular inner edge extending between said gasket mounting face and said coupling mounting face, said inner edge of said positioning flange defining an axial dimension less than the projection of said annular sealing bead from said end face and defining a diameter greater than said annular sealing bead of said first coupling component, wherein portions of said fingers are angled inwardly and are resiliently deflectable outwardly for secure releasable engagement with said first coupling component.

18. The assembly of claim 17, wherein said gasket seat defines an axial dimension greater than said thickness of said gasket by a distance less than said axial projection of said annular sealing bead from said end face.

19. The assembly of claim 14, wherein said retainer is unitarily formed from PCTFE.

20. The assembly of claim 14, wherein said retainer is transparent.

21. A fluid coupling comprising:

- first and second coupling components, each said coupling component including an annular end face and a fluid passageway extending into said end face and through said respective component, an annular sealing bead projecting from each said end face a selected axial distance and surrounding the fluid passageway of said component, at least said first coupling component including a cylindrical surface of specified diameter extending orthogonally from said end face thereof;
- a nut rotatably mounted around said first coupling component and being threadedly engageable with said second coupling component for urging said coupling components toward one another, said nut including a probe hole extending radially therethrough for permitting visual observation of portions of said coupling adjacent said annular sealing beads;

a generally annular metal gasket intermediate said annular sealing beads of said coupling components, said gasket having an outer circumferential surface defining an outside diameter approximately equal to said specified diameter of said cylindrical surface of said first coupling component; and a gasket retainer unitarily formed of a transparent PCTFE and being of generally tubular shape, said retainer including a gasket mounting end and an opposed coupling mounting end, a positioning flange projecting inwardly intermediate said opposed ends and being disposed intermediate said gasket and said end face of said first coupling component, portions of said retainer intermediate said positioning flange and said gasket mounting end defining a transparent gasket seat grippingly engaging said outer circumferential surface of said gasket, portions of said retainer between said positioning flange and said coupling mounting end releasably engaging said cylindrical surface of said first coupling component and being characterized by a plurality of axially aligned slits extending therethrough and communicating with portions of said first coupling component adjacent the end face thereof, whereby said transparent gasket mounting seat permits visual checking for said gasket through said probe hole of said nut, and wherein said slots permit leak testing of said coupling.

* * * * *